US012756904B2

(12) United States Patent
Penha et al.

(10) Patent No.: US 12,756,904 B2
(45) Date of Patent: Oct. 6, 2026

(54) DESCRIPTOR-BASED CONTEXTUALIZATION AND STREAMING OF MEDIA CONTENT ITEMS

(71) Applicant: Spotify AB, Stockholm (SE)

(72) Inventors: Gustavo Penha, Delft (NL); Alice Wang, New York, NY (US); Hugues Bouchard, Barcelona (ES)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 19/085,264

(22) Filed: Mar. 20, 2025

(65) Prior Publication Data

US 2026/0292308 A1 Sep. 24, 2026

(51) Int. Cl.

| | |
|---|---|
| ***H04N 21/482*** | (2011.01) |
| ***G06F 16/435*** | (2019.01) |
| ***G06F 16/438*** | (2019.01) |
| ***H04N 21/278*** | (2011.01) |

(52) U.S. Cl.
CPC ....... *H04N 21/4826* (2013.01); *G06F 16/435* (2019.01); *G06F 16/438* (2019.01); *H04N 21/278* (2013.01)

(58) Field of Classification Search
CPC ........................ H04N 21/4826; H04N 21/278; G06F 16/435; G06F 16/438
See application file for complete search history.

(56) References Cited

U.S. PATENT DOCUMENTS

| | | | | |
|---|---|---|---|---|
| 11,423,037 | B1 * | 8/2022 | Peng | G06F 16/9535 |
| 11,544,336 | B2 | 1/2023 | Puri | |
| 12,050,574 | B2 | 7/2024 | Emma | |
| 2022/0350990 | A1 * | 11/2022 | Phillips | G06F 16/783 |
| 2023/0401464 | A1 * | 12/2023 | Fan | G06F 16/735 |
| 2024/0256764 | A1 | 8/2024 | Maschmeyer | |
| 2024/0303268 | A1 | 9/2024 | Graham | |
| 2024/0386219 | A1 | 11/2024 | Palumbo | |
| 2024/0403551 | A1 | 12/2024 | Berglund | |
| 2025/0110690 | A1 * | 4/2025 | Bates | G06F 3/167 |

FOREIGN PATENT DOCUMENTS

| | | | |
|---|---|---|---|
| CN | 119377442 | A | 1/2025 |

* cited by examiner

*Primary Examiner* — Sumaiya A Chowdhury
(74) *Attorney, Agent, or Firm* — McDonnell Boehnen Hulbert & Berghoff LLP

(57) ABSTRACT

An example embodiment may involve: obtaining a ranking of media content items recommended for a user, wherein the media content items are respectively associated with sets of descriptors, and wherein the sets of descriptors were generated by a natural language model based on metadata associated with the media content items; based on relevance of the descriptors to the user and appearances of the descriptors in the ranking of the media content items, determining a ranking at least a portion of the descriptors; selecting groups of the media content items respectively associated with the descriptors in the ranking of the descriptors; and providing, for display on a user device associated with the user, the groups of the media content items populated on virtual shelves representing the respectively associated descriptors.

20 Claims, 8 Drawing Sheets

DESCRIPTOR-BASED CONTEXTUALIZATION AND STREAMING OF MEDIA CONTENT ITEMS

FIELD OF THE INVENTION

The present invention relates to the field of media content item streaming. Specifically, it pertains to methods, systems, and devices for contextualization of media content items.

BACKGROUND

Media recommendation systems determine suggested media content items (e.g., audio and/or video content including songs, podcast episodes, and audiobooks) from a plurality thereof for presentation to users. This presentation may be in the form of a suggestion of one or more media content items or a proposed playlist. The users may select to consume (e.g., play out audibly and/or visually) some, all, or none of any of these suggestions.

SUMMARY

A media delivery environment (e.g., providing streamed and/or downloaded media content) may include at least millions of users and tens of millions of media content items. Selecting media content items to present to users in such an environment may involve complex algorithms that are computationally expensive to execute. Even so, the selected media content items may be presented in a manner that lacks context and therefore may be overlooked by the users.

Current context-based explainability techniques rely on item properties such as tags, topics, and reviews to create context and/or explanations that go along with recommended media content items. By giving more context to a recommendation, the system can achieve goals such as improving trust and increasing transparency. However, explaining a single recommendation is often not enough, as multiple media content items are frequently recommended together and/or at the same time. Furthermore, current techniques do little to help the "cold start" recommendation problem, where a new media content item with minimal metadata (e.g., no tags or reviews) is added to the system.

More accurate recommendation systems are inherent technical improvements over less accurate recommendation systems because they use fewer computational resources (e.g., processing, memory, network, and/or power capacity). This is at least in part due to users being more likely to accept their recommendations, and therefore recommendation determinations need to be executed less frequently.

A system of one or more computers can be configured to perform particular operations or actions by virtue of having software, firmware, hardware, or a combination thereof installed on the system that, in operation, causes or cause the system to perform the actions. One or more computer programs can be configured to perform particular operations or actions by virtue of including instructions that, when executed by a data processing apparatus, cause the apparatus to perform the actions.

One general aspect involves a computer-implemented method that includes obtaining a ranking of media content items recommended for a user, where the media content items are respectively associated with sets of descriptors, and where the sets of descriptors were generated by a natural language model based on metadata associated with the media content items. The method also includes based on relevance of the descriptors to the user and appearances of the descriptors in the ranking of the media content items, determining a ranking at least a portion of the descriptors. The method also includes selecting groups of the media content items respectively associated with the descriptors in the ranking of the descriptors. The method also includes providing, for display on a user device associated with the user, the groups of the media content items populated on virtual shelves representing the respectively associated descriptors. Other embodiments of this aspect include corresponding computer systems, apparatus, and computer programs recorded on one or more computer storage devices, each configured to perform the actions of the method.

Another general aspect involves a computer-implemented method that includes determining audiobook information including at least one of author, title, or description of an audiobook. The method also includes providing, to a natural language model, a query instructing the natural language model to determine a set of descriptors based on the audiobook information and a taxonomy of descriptor types. The method also includes receiving, from the natural language model, the set of descriptors. The method also includes associating the set of descriptors with the audiobook. The method also includes determining that the audiobook has been recommended for a user. The method also includes selecting the audiobook to be populated on a virtual shelf that is associated with a descriptor from the set of descriptors. The method also includes providing, for display on a user device associated with the user, the virtual shelf populated with the audiobook. Other embodiments of this aspect include corresponding computer systems, apparatus, and computer programs recorded on one or more computer storage devices, each configured to perform the actions of the method.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Example methods, devices, and systems are described herein. It should be understood that the word "example" or "exemplary" to the extent used herein means "serving as a possible instance or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, any separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Still further, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

In addition, unless clearly indicated otherwise herein, the term "or" is to be interpreted as the inclusive disjunction. For example, the phrase "A, B, or C" is true if any one or more of the arguments A, B, C are true, and is only false if all of A, B, and C are false.

I. EXAMPLE SYSTEM AND DEVICE ARCHITECTURE

Figure 1:
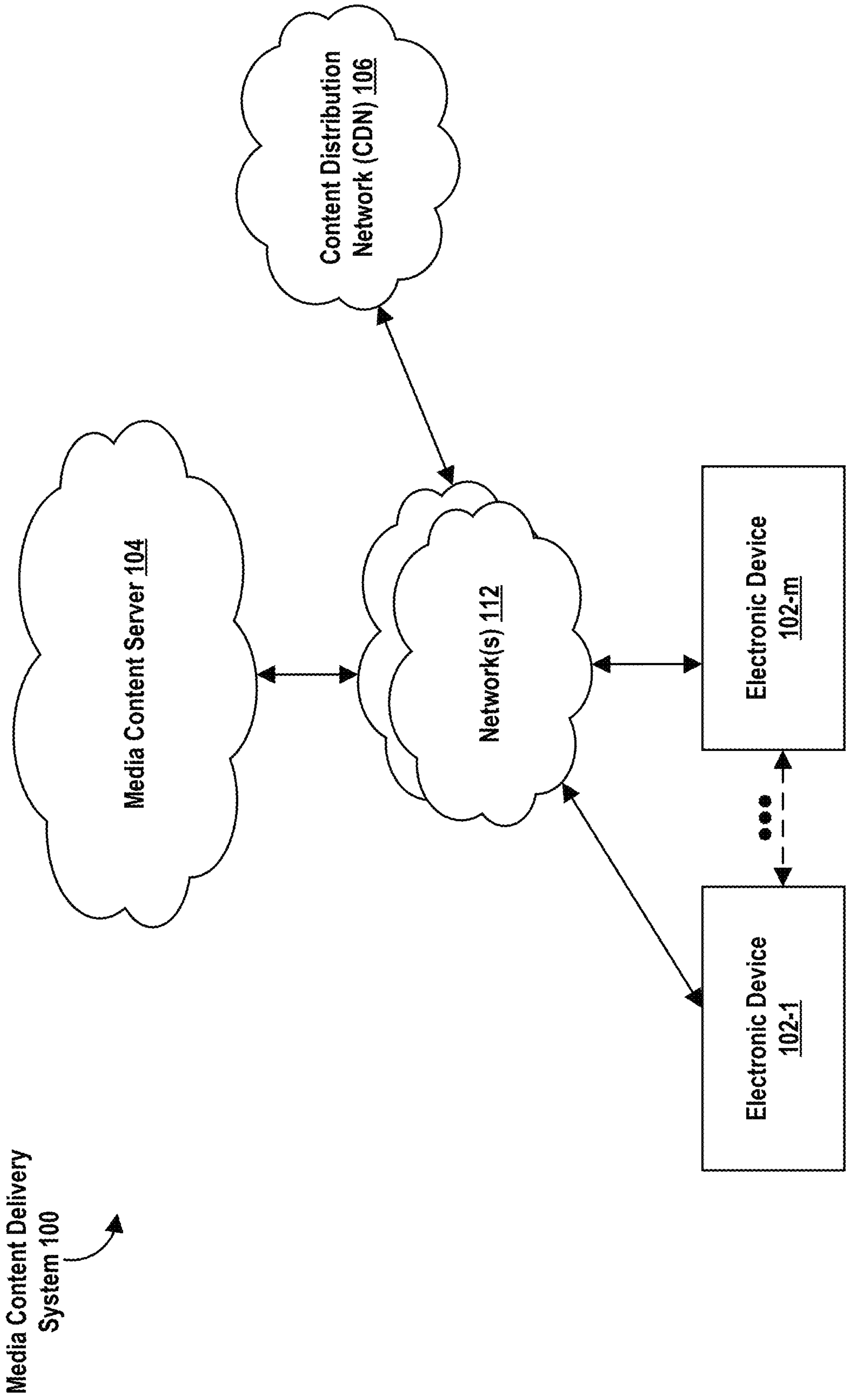
FIG. 1 is a block diagram illustrating a media content delivery system, in accordance with example embodiments.

FIG. 1 is a simplified block diagram illustrating an example media content delivery system 100. The example media content delivery system 100 includes one or more electronic devices 102 (e.g., electronic device 102-1 to electronic device 102-*m*, where m is an integer greater than one), at least one media content server 104, and at least one content distribution network (CDN) 106. With this arrangement, the media content server 104 may be configured to stream or otherwise provide media content items, possibly through the CDN 106, for receipt and playout by the electronic devices 102.

Media content items (also referred to as "media content", "content", "media items", and "content items") may take various forms. For instance, the media content items may include audio (e.g., music, spoken word, podcasts, audiobooks, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2D or 3D graphics-based computer games, etc.), web pages, and/or any combination of these and/or other types of content. In some embodiments, media content items may include one or more audio media content items, such as particular songs, podcasts, or audiobooks, that may be referred to as "audio items," "tracks," and/or "audio tracks".

As shown, one or more networks 112 may communicatively couple the components of the media content delivery system 100. The one or more networks 112 may include public communication networks, private communication networks, or a combination of both public and private communication networks. For example, the one or more networks 112 could include one or more wide area networks (WANs) such as the Internet, a cellular network, and a satellite communication network, and/or could include one or more local area networks (LAN), virtual private networks (VPN), metropolitan area networks (MAN), peer-to-peer networks, mesh networks, and/or ad-hoc connections, among other possibilities.

Example electronic devices 102, which may be associated respectively with one or more users, may take various forms. For instance, an electronic device 102 could be a personal computer, a mobile electronic device, a wearable computing device, a laptop computer, a tablet computer, a mobile phone, a feature phone, a smartphone, an infotainment system, a digital media player, a gaming device, a speaker, a television (TV), and/or any other electronic device capable of playing and/or presenting media content (e.g., controlling playback of media items, such as music tracks, podcasts, videos, etc.) Alternatively, the electronic device 102 may be a component of another system such as a home entertainment system, a radio/alarm clock, or an infotainment system of a vehicle, for instance, and may enable that system to play media content.

In some embodiments, the electronic devices 102 may be the same type of device as each other (e.g., electronic device 102-1 and electronic device 102-*m* are both speakers). In other embodiments, the electronic devices 102 may include two or more different types of devices.

The example electronic devices 102 may also be configured to communicate with each other through direct or networked communication links, represented by the dashed arrow in FIG. 1, which may include wireless and/or wired connections. For instance, the electronic devices 102 may communicate with each other through a direct wired connection such as a High Definition Multimedia Interface (HDMI) connection, or through a direct wireless communication such as short or medium range wireless signaling using technologies such as BLUETOOTH, BLUETOOTH LOW ENERGY (BLE), ZIGBEE, WI-FI, WIRELESSHART, Near Field Communication (NFC), Radio Frequency Identification (RFID), infrared, Thread, Z-Wave, MiWi, Low-Rate Wireless Personal Area Network (LR-WPAN), or Internet Protocol v. 6 (IPv6) over WPAN (6oWPAN), among other possibilities. Alternatively or additionally, the electronic devices 102 may communicate with each other through one or more networks (perhaps one or more of network(s) 112), such as through a wireless mesh network, a LAN, a cellular network, or other form of network. Through these inter-device connections, one electronic device 102-1 may stream or otherwise transmit media content to another electronic device 102-*m* to facilitate playout of the media content.

An example electronic device 102 may be configured to play media content items, outputting the associated media content for presentation to a user and/or outputting the associated media content through an inter-device connection to another electronic device for presentation to a user.

The electronic device 102 may obtain these media content items from local data storage and/or through transmission from the media content server 104, CDN 106, or other device or system. For instance, the electronic device 102 may include or otherwise have access to local data storage containing some of these media content items and may be configured to retrieve the media content items from that local data storage and to play out the retrieved media content items. Further the electronic device 102 may be configured to interwork with the media content server 104 to cause the media content server 104 to stream, progressively download, and/or otherwise transmit media content items to the electronic device 102, and the electronic device 102 may be configured to receive and play out those transmitted media content items as well. In some cases, an example electronic device 102 may also be configured to transmit to the media content server 104 indications of media content items, possibly the media content items themselves, for various purposes.

To facilitate playout of media content items, the example electronic device 102 may be programmed with a media application. The media application may provide a user interface (e.g., a graphical user interface (GUI)) through which a user of the electronic device 102 can control playing of media content items, and the media application may include a media-playback engine configured to obtain and play out media content items in response to user control commands and/or other triggers.

For instance, the media application may receive a user's control commands related to playout of media content items, such as requests to play particular media content items or playlists of media content items and commands to pause or stop media playout, to adjust volume, or to jump to a next track or a previous track, among other possibilities. And the media application may be configured to respond to those commands by engaging in associated control signaling with the media content server 104 to control streaming or other transmission of media content items from the media content server 104 to the electronic device 102 and/or by engaging in associated control of playing out media content items from local data storage.

An example media content server 104 may be configured to receive media commands or other requests from electronic devices 102 and to respond accordingly. To facilitate this, in some embodiments, the media content server 104 may provide an application programming interface (API), such as a voice API or a connect API, accessible by one or more of the electronic devices 102. The media content server 104 may also be configured to validate (e.g., authenticate) electronic devices 102 using a key service, such as by exchanging one or more keys (e.g., tokens) with the electronic device 102.

The example media content server 104 may include or otherwise have access to data storage storing media content items available for transmission to electronic devices 102, as well as playlists each defining a sequence or other set of media content items for playout. Playlists may be defined by users of the electronic devices 102, by editors associated with media-providing services, and/or by machine-based processes, among other possibilities. The media content server 104 may also be configured to provide electronic devices 102 with information about the available media content items and playlists, such as web pages or other interfaces presenting the information, to enable users of the electronic devices 102 to obtain this information and to correspondingly control media playout.

Further, in some implementations, the media content server 104 may interwork with the one or more CDNs 106 to facilitate management and transmission of media content items and associated information to the electronic devices 102. For instance, a CDN 106 may cache media content items, playlists, and associated data and may be configured to transmit this data to electronic devices 102 through the network(s) 112 in response to requests from the electronic devices.

Figure 2:
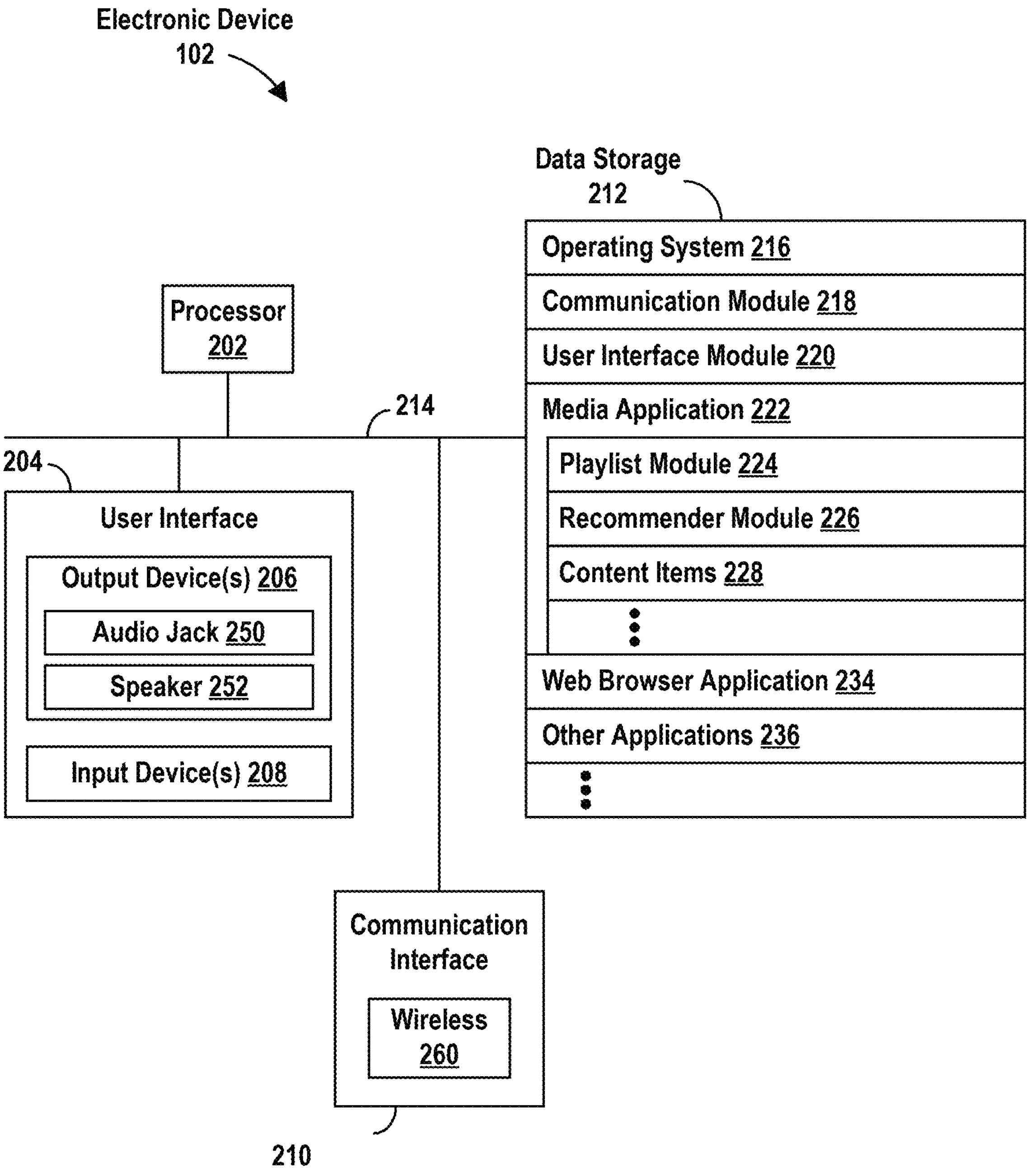
FIG. 2 is a block diagram illustrating an electronic device, in accordance with example embodiments.

FIG. 2 is simplified a block diagram illustrating an example electronic device 102. As shown in FIG. 2, the example electronic device 102 includes a processor 202, a user interface 204, a communication interface 210, and non-transitory data storage 212, any or all of which may be integrated together to various extents and/or communicatively linked with each other by a system bus, network, or other connection mechanism 214, on a chipset or other integrated circuit, among other possibilities.

The processor 202 may include one or more general purpose processors (e.g., microprocessors) and/or one or more specialized processors (e.g., digital signal processors (DSPs), graphics processing units (GPUs), neural processing units (NPUs), etc.)

The user interface 204 may include one or more output devices 206 and one or more input devices 208 to facilitate interaction with a user. Example output devices 206 may include audio output devices such as an audio jack 250, a sound speaker 252, and/or another port or the like for connecting with speakers, earbuds, headphones, and/or other listening devices, and video output devices, such as a display panel for instance. Further, example input devices 208 may include an audio input device such as a microphone and other types of user input mechanisms such as a touch-sensitive panel, a keyboard or keypad, and/or a mouse or trackpad, among other possibilities. In some embodiments, the user interface may support voice input, and the electronic device 102 may include or interact with a voice recognition system to facilitate processing of voice input from a user.

The communication interface 210 may include one or more components to facilitate communicating with other electronic devices 102, with the media content server 104, with the CDN 106, with associated media presentation systems, and/or with other devices and/or systems. For instance, the communication interface 210 may include one or more wireless communication interfaces 260 configured to facilitate direct or networked communication according to any of various wireless communication protocols, such as those noted above, among others. In addition or alternatively, the communication interface 210 may include one or more wired communication interfaces supporting direct or networked communication according to any of various wired communication protocols, such as HDMI, Universal Serial Bus (USB), THUNDERBOLT, and/or Ethernet, among others.

The non-transitory data storage 212 may include one or more volatile and/or non-volatile storage components (e.g., flash, optical, magnetic, read only memory (ROM), random access memory (RAM) (e.g., dynamic RAM (DRAM), static RAM (SRAM), or double data rate RAM (DDRAM)), electronically programmable read only memory (EPROM), and/or electronically erasable programmable read only memory (EEPROM), etc.), which may be integrated in whole or in part with the processor 202 or may be provided separately. As further shown, the data storage 212 may store program instructions, which may be executable by the processor 202 to carry out various electronic device operations.

These instructions may define programs, modules, and/or data structures, such as but not limited to an operating system 216, a communication module 218, a user interface module 220, a media application 222, a web browser application 234, and one/or more other applications 236. Further, these instructions may be structured as separate software programs, procedures, modules, or the like, and/or may be combined together and/or otherwise arranged in various embodiments.

The operating system 216 may define procedures for handling various basic system services and for performing hardware-dependent tasks. The communication module 218 may define procedures supporting connection and communication with other computing devices and systems (e.g., with the media content server 104, the CDN 106, with various media presentation systems, and/or with other electronic devices 102) through the communication interface 210 and possibly the one or more networks 112. And the user interface module 220 may define procedures supporting use of the user interface 204, such as to receive commands and/or other input from a user and to provide media playback and other output to the user.

In line with the discussion above, the media application 222 may be a program application configured to access a media-providing service of a media-content provider associated with the media content server 104 for instance, and may be configured to support requesting, receiving, processing, and presenting of media content items. In some implementations, the media application 222 may include a media-player, a streaming-media application, and/or any other appropriate application or component to facilitate retrieval and/or receipt of media content and playing of the media content. Further, the media application 222 may be configured to monitor, store, and/or transmit (e.g., to the media content server 104) data associated with user behavior, with user permission. Further, the media application 222 may define various logic modules, such as a playlist module 224, a recommender module 226, and/or a content-items module 228.

The playlist module 224 may store sets of media items for playback in a predefined order. Further, the playlist module 224 may be configured to generate playlists. In some embodiments, the playlist module 224 may include a diffusion-model component, a large-language-model component, and/or a nearest-neighbor-search component, among other possibilities. The recommender module 226 may be configured to identify and/or display recommended media content items (e.g., for inclusion in a playlist). The recommender module 226 may likewise include a diffusion-model component, a large-language-model component, and/or a nearest-neighbor-search component, among other possibilities. The content-items module 228 may be configured to store media content items, including audio items such as songs, podcasts, and audiobooks, for playback, and to provide requests for media content items to the media content server 104. In some implementations, the content-items module 228 may include or otherwise have access to a set of vector representations for the media content items.

The web browser application 234 may be configured to support user access, viewing, and interaction with web sites. To facilitate this, the web browser application 234 may be configured to use standard web-based communication protocols, web-based applications, and/or web-based content formats and/or may be configured to use proprietary protocols, applications, and formats.

The other applications 236 in the non-transitory data storage 212 of the electronic device 102 may then include any of a variety of additional applications, supporting operations such as word processing, calendaring, mapping, weather, time keeping, virtual digital assistant, presenting, drawing, instant messaging, e-mail, telephony, video conferencing, photo management, video management, music playing, video playing, 2D gaming, 3D (e.g., virtual reality) gaming, electronic book reading, and/or workout management, among other possibilities.

The example electronic device 102 may also include one or more sensors (not shown) such as accelerometers, gyroscopes, compasses, magnetometer, light sensors, near field communication transceivers, barometers, humidity sensors, temperature sensors, proximity sensors, range finders, and/or other devices for sensing and measuring various operational, environmental and/or other conditions, among possibly other components.

Figure 3:
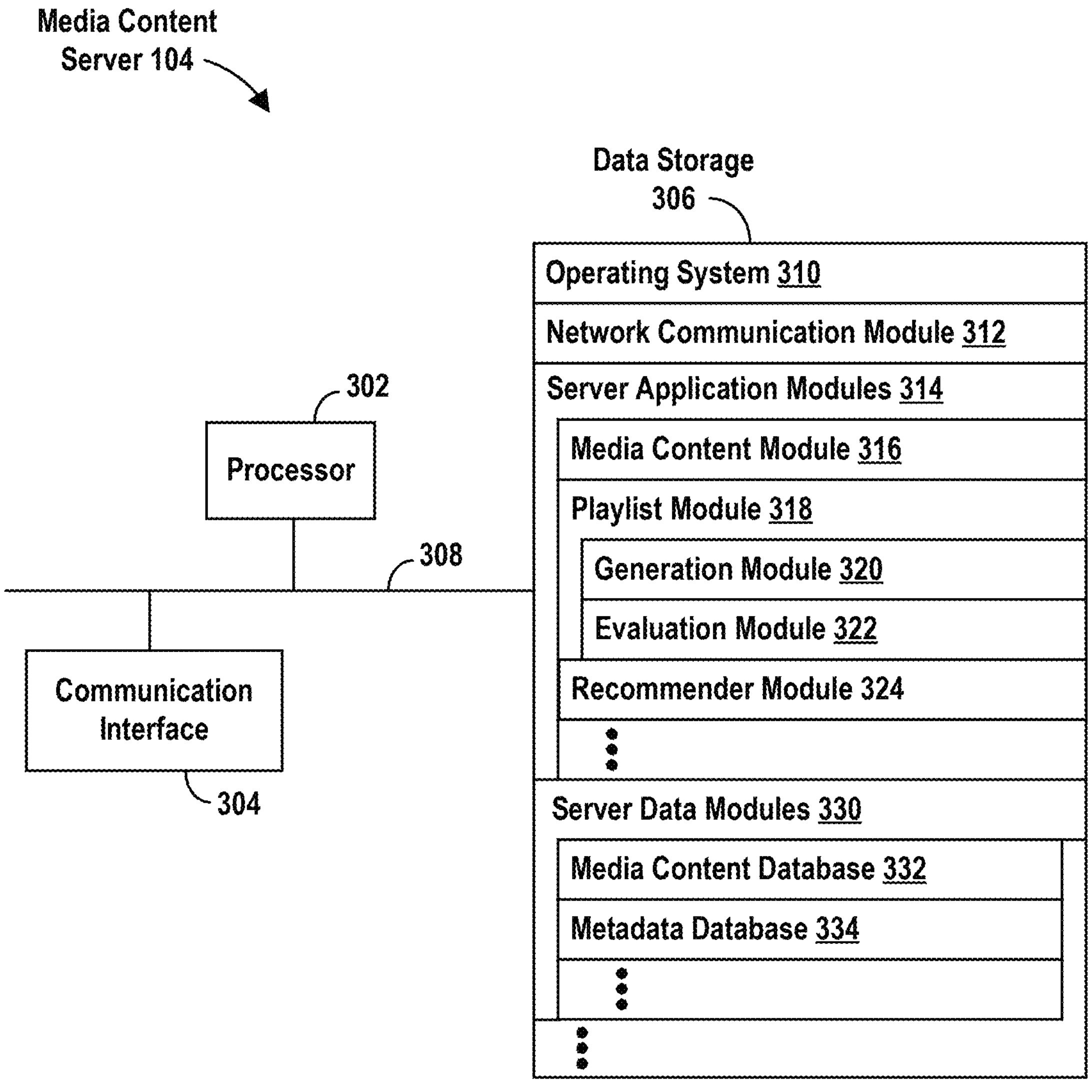
FIG. 3 is a block diagram illustrating a media content server, in accordance with example embodiments.

FIG. 3 is next a simplified block diagram of an example media content server 104. As shown in FIG. 3, the example media content server 104 includes a processor 302, a communication interface 304, and non-transitory data storage 306, any or all of which may be integrated together to various extents and/or communicatively linked with each other by a system bus, network, or other connection mechanism 308, on a chipset or other integrated circuit, among other possibilities.

The processor 302 may include one or more general purpose processors (e.g., microprocessors) and/or one or more specialized processors (e.g., DSPs, GPUs, NPUs, etc.)

The communication interface 304 may comprise a network communication interface to facilitate communicating with the electronic devices 102 and the CDN 106 through the one or more networks 112. For instance, the communication interface 304 may include a wired and/or wireless Ethernet communication module, among other possibilities.

The non-transitory data storage 306 may include one or more volatile and/or non-volatile storage components (e.g., flash, optical, magnetic, ROM, RAM) (e.g., DRAM, SRAM, or DDRAM), EPROM, and/or EEPROM, etc.), which may be integrated in whole or in part with the processor 302 or may be provided separately. As further shown, the data storage 306 may store program instructions, which may be executable by the processor 302 to carry out various media-content-server operations.

These instructions may define programs, modules, and/or data structures, such as but not limited to an operating system 310, a network communication module 312, one or more server application modules 314, and one or more server data modules 330. Further, these instructions may be structured as separate software programs, procedures, modules, or the like, and/or may be combined together and/or otherwise arranged in various embodiments.

The operating system 310 may define procedures for handling various basic system services and for performing hardware-dependent tasks. And the communication module 312 may define procedures supporting connection and communication with other computing devices and systems, such as with the electronic devices 102 and the CDN 106, through the communication interface 304 and possibly through the one or more networks 112.

The one or more server application modules 314 may define procedures supporting providing and managing a content service. These server application modules 314 may include a media content module 316, a playlist module 318, and/or a recommender module 324, among other possibilities.

The media content module 316 may store and/or otherwise have access to media content items and may be configured to send (e.g., stream and/or progressively transmit) the media content items to the electronic devices 102. The playlist module 318 may store and/or otherwise have access to data defining sequences or other sets of media content items and may be configured to send those playlists to the electronic devices 102. The playlist module 318 may include a generation module 320 for generating playlists and media sets, and an evaluation module 322 for evaluating the playlists and media sets, e.g., before and after publication. Further, the playlist module 318 may include a diffusion-model component, a large-language-model component, and/or a nearest-neighbor-search component, among other possibilities.

The recommender module 324 may determine and/or provide media-content-item recommendations (e.g., for a playlist). In some embodiments, the recommender module 324 also includes a diffusion-model component, a large-language-model component, and/or a nearest neighbor-search component, among other possibilities.

The one or more server data modules 330 may manage the storage of and/or access to media items and/or metadata relating to media content items. As such, the one or more server data modules 330 may include a media content database 332 for storing media items and/or vector representations (e.g., vector embeddings) of the media content items, and a metadata database 334 for storing metadata relating to the media content items, such as genre, artist, and other information associated with the respective media content items.

The media content server 104 may also include a web server such as a Hypertext Transfer Protocol (HTTP) servers, File Transfer Protocol (FTP) servers, and may maintain or otherwise have access to web pages and other content defined with Common Gateway Interface (CGI) script, PUP Hyper-text Preprocessor (PUP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

The description of the media content server 104 as a "server" is intended as a functional description of the devices, systems, processor cores, and/or other components that provide the functionality attributed to the media content server 104. It will be understood that the media content server 104 may be a single server computer, or may comprise multiple server computers. Moreover, the media content server 104 may be coupled with CDN 106 and/or other servers and/or server systems, or other devices, such as other client devices, databases, content delivery networks (e.g., peer-to-peer networks), network caches, and the like. Further, in some embodiments, the media content server 104 may be implemented by multiple computing devices working together to perform the actions of a server system, such as to provide cloud-based server or cloud-computing service.

II. DIGITAL AUDIO CONTENT AND STREAMING

Digital audio content may encompass a broad range of audio data that has been converted into a digital format, enabling it to be stored, processed, transmitted, and received by electronic devices. By way of example, digital audio content could include songs and other music, as well as spoken word recordings such as news broadcasts, podcasts, audiobooks, that offer listeners a convenient way to consume information and entertainment through auditory means. Further, digital audio content could combine spoken word with music or other sounds, creating rich, multi-layered audio experiences suitable for radio shows, multimedia presentations, and enhanced podcasts. And still further, digital audio content could constitute the audio portion of multimedia video content (e.g., of H.264/MPEG-4 or 3GP encoded content), such as the soundtrack of a movie, television show, online video, or live stream, among many other possibilities.

Digital audio content represents analog audio content as a sequence of digital information such as a bits representing sequential frames of the analog audio. Digital audio content may be compressed or otherwise encoded using various encoding techniques (e.g., MP3, AAC, or Opus) to help reduce file size while maintaining quality and to help facilitate distribution of the audio through various techniques such as streaming, progressive downloading, bulk file transfer, or broadcasting, for instance.

Digital audio streaming involves transmitting a digital audio stream from a content source (e.g. media content server 104 or CDN 106) to an electronic device 102, typically over a network 112, for real-time playout of the audio by the electronic device 102 as the electronic device 102 receives the transmission. A variation of audio streaming is progressive downloading, where an electronic device 102 downloads a digital audio file in pieces and plays out the audio file before the entire download is finished. One technical difference between streaming and progressive downloading is that, with streaming, the electronic device 102 usually does not maintain a copy of the audio as the electronic device 102 plays it out, whereas with progressive downloading, the electronic device 102 ends up with a downloaded copy of the audio for possible later playout as well.

To prepare digital audio for streaming or other distribution, a computing system such as the media content server 104 may start with a digital audio file that defines a time sequence of digital audio data such as a sequence of audio frames, the computing system may encode the digital audio data of the file using an encoding algorithm to establish a corresponding time sequence of encoded digital audio data, and the computing system may segment the encoded digital audio data into smaller pieces or audio segments, which the computing system may store for transmission. Further, the computing system may generate multiple different encoded versions of the digital audio segments per file, using multiple different levels or types of encoding and compression, to facilitate adaptive switching between versions during transmission.

To facilitate streaming of an audio content item to an electronic device 102, the media content server 104 may employ a streaming protocol such as HTTP Live Streaming (HLS), Dynamic Adaptive Streaming over HTTP (DASH), or Real-Time Messaging Protocol (RTMP) to transmit the audio segments. These protocols manage the data transmission and adapt to varying network conditions. Additionally, the media content server 104 may handle user sessions, managing requests for specific audio streams and providing secure access through authentication and authorization mechanisms. The media content server 104 may also make use of the CDN 106, which may cache the audio content pieces on geographically distributed servers, to help reduce streaming latency and improve reliability and user experience.

On the receiving end, the media application 222 of the electronic device 102 may initiate a connection to the media content server 104 and request streaming of a specific audio content item. As the media application 222 receives the initial audio segments of the requested audio content in response to this request, the media application 222 may then start buffering and pre-loading a portion of the audio in the memory of the electronic device 102 to facilitate smooth playback even in the case of minor network interruptions. Further, the media application 222 may decode the audio pieces in order to uncover the original digital audio data and may convert that digital audio data to a form suitable for output. For instance, the media application 222 may play the decoded audio through an audio output device 206 of the electronic device 102 or through another electronic device 102. Further, the media application 222 may manage playback (e.g., play, pause, skip, and volume adjustment) through associated user-interface controls.

Adaptive streaming protocols such as those discussed above may allow the electronic device 102 to monitor network conditions and request different quality levels of digital audio content based on current bandwidth availability, thus providing consistent playback without interruptions in most cases. Further, the electronic device 102 may handle network errors and interruptions by attempting to reconnect to the media content server 104, by re-buffering when necessary, and by dynamically adjusting the stream quality to maintain a continuous audio experience.

III. LANGUAGE MODELS

Generative artificial intelligence models, such as large language models (LLMs), can be used for selection of media content items for streaming to electronic devices 102. These LLMs may be part of, operate in conjunction with, and/or be accessed by media content server 104.

An LLM is an advanced computational model, primarily functioning within the domain of natural language processing (NLP) and machine learning. An LLM can be configured to understand, interpret, generate, and respond to human language in a manner that is both contextually relevant and syntactically coherent. The underlying structure of an LLM is typically based on a neural network architecture, more specifically, a variant of the transformer model. Transformers are notable for their ability to process sequential data, such as text, with high efficiency.

The operation of an LLM involves layers of interconnected processing units, known as neurons, which collectively form a neural network. This network can be trained on vast datasets comprising text from diverse sources, thereby enabling the LLM to learn a wide array of language patterns, structures, and colloquial nuances for prose, poetry, and program code. The training process involves adjusting the weights of the connections between neurons using algorithms such as backpropagation, in conjunction with optimization techniques like stochastic gradient descent, to minimize the difference between the LLM's output and expected output.

An aspect of an LLM's functionality is its use of attention mechanisms, particularly self-attention, within the transformer architecture. These mechanisms allow the model to weigh the importance of different parts of the input text differently, enabling it to focus on relevant aspects of the data when generating responses or analyzing language. The self-attention mechanism facilitates the model's ability to generate contextually relevant and coherent text by understanding the relationships and dependencies between words or tokens in a sentence (or longer parts of texts), regardless of their position.

In response to receiving an input, such as a text query or a prompt, the LLM may process this input through its multiple layers, generating a probabilistic model of the language therein. It predicts the likelihood of each word or token that might follow the given input, based on the patterns it has learned during its training. The model then generates an output, which could be a continuation of the input text, an answer to a query, or other relevant textual content, by selecting words or tokens that have the highest probability of being contextually appropriate.

Furthermore, an LLM can be fine-tuned after its initial training for specific applications or tasks. This fine-tuning process involves additional training (e.g., with reinforcement from humans), usually on a smaller, task-specific dataset, which allows the model to adapt its responses to suit particular use cases more accurately. This adaptability makes LLMs highly versatile and applicable in various domains, including but not limited to, chatbot development, language translation, and sentiment analysis.

Some LLMs are multimodal in that they can receive prompts in formats other than text and can produce outputs in formats other than text. Thus, while LLMs are predominantly designed for understanding and generating textual data, multimodal LLMs extend this functionality to include multiple data modalities, such as visual and auditory inputs, in addition to text.

A multimodal LLM can employ an advanced neural network architecture, often a variant of the transformer model that is specifically adapted to process and fuse data from different sources. This architecture integrates specialized mechanisms, such as convolutional neural networks for visual data and recurrent neural networks for audio processing, allowing the model to effectively process each modality before synthesizing a unified output.

The training of a multimodal LLM involves multimodal datasets, enabling the model to learn not only language patterns but also the correlations and interactions between different types of data. This cross-modal training results in multimodal LLMs being adept at tasks that require an understanding of complex relationships across multiple data forms, a capability that text-only LLMs do not possess. This makes multimodal LLMs particularly suited for advanced applications that necessitate a holistic understanding of multimodal information, such as chatbots that can interpret content.

LLMs can also perform tasks through "reasoning." For example, an LLM can decompose its processing of a query into a series of structured logical steps in a manner akin to chain-of-thought prompting, wherein intermediate inferential stages are explicitly articulated prior to generating a final response. Initially, the LLM may engage in semantic parsing, identifying elements, contextual parameters, and constraints associated with the query. Subsequently, the LLM may retrieve relevant knowledge by leveraging its trained parameters and/or from one or more external sources to approximate probabilistic associations within its latent space. The next stage may involve logical inference, wherein the model establishes relationships, synthesizes retrieved knowledge, and deduces conclusions based on pattern recognition and prior training data. For problem-solving applications requiring sequential reasoning—such as mathematical computations, algorithmic execution, or structured argumentation—the LLM applies an iterative, stepwise approach to facilitate coherence and logical consistency. Once intermediate reasoning steps are completed, the LLM can synthesize its analysis into a final response, with the goal of being in alignment with the original query. Optionally, the LLM may engage in self-verification, employing internal consistency checks to refine, validate, or enhance its response by evaluating potential contradictions or errors The embodiments herein may provide parameterized prompts to an LLM and receive parameterized outputs in response. Thus, media content server 104, or a device or system adjunct to media content server 104, may produce such a prompt based on a pre-established prompt template and then transmit the prompt to the LLM. The LLM may respond with parameterized output, which can then be parsed to identify tokens therein.

IV. CONTEXTUALIZED RECOMMENDATION OF MEDIA CONTENT ITEMS

Various embodiments herein involve contextualized recommendation of media content items. While these embodiments are described herein focusing on the media content items being audiobooks, these techniques could also be applied to songs, podcast episodes, and/or videos, for example.

Media content item recommendation systems help users navigate, discover, and filter through large catalogs of items, such as audiobooks. A possible layout for online platforms is to have rows of recommended items grouped under a title that can be explored by scrolling horizontally. The titles of such "virtual shelves" provide additional context to the items, acting as explanations to assist users in their decision-making process.

Virtual shelves and items arranged or presented thereon can be personalized to each user. For example, one user may be predicted to have an affinity for "Mindfulness" while another may like "Thrilling Murder Mysteries." For each user, the system would recommend a virtual shelf of contents a user will likely engage with and package the virtual shelf with an appropriate title that describes the contents and provides context.

Previous approaches that generate content-based explanations for recommendations often rely on extracting information from user reviews, user-generated tags, or using items' metadata. However, such user-generated content and metadata are not always available. For example, when audiobooks are added as a new type of media content item to a streaming platform, there typically are no user reviews or user-generated tags associated with these audiobooks.

To overcome this cold-start problem, an extraction approach using LLMs can be used to enrich the content of the audiobooks in the catalog with descriptors that are grounded on these items' inherent metadata (e.g., title, author(s), description, and/or other information). Based on the enriched metadata, a processing pipeline can be used to generate descriptive virtual shelves that group media audiobooks into thematic and personalized lists for recommendation to users. The descriptiveness of the virtual shelves aid users in their decision-making and catalog exploration process by contextualizing recommendations. Virtual shelves also improve the discoverability and exposure of media content items through generating recommendations with more diversity.

Improving a media content item recommendation system can directly lead to technical enhancements in computing systems by reducing resource consumption such as processing, memory, network, and/or power capacity. A more accurate recommendation algorithm reduces unnecessary processing by precisely identifying relevant media content item recommendations, eliminating extensive computations associated with analyzing large datasets of user behavior or content metadata. Consequently, less processor time and fewer memory resources are spent on redundant analyses.

Moreover, when users receive accurate recommendations, they spend less time browsing, sampling, or initiating unnecessary media content item streams, significantly decreasing network traffic and bandwidth consumption. Fewer requests directly translate into reduced power usage across servers, data centers, and user devices. Thus, enhanced recommendation accuracy leads to a more efficient, sustainable, and resource-friendly computing infrastructure.

A. Content Descriptors

In order to facilitate the grouping of media content items, a taxonomy of descriptor types was developed. To define such taxonomy for audiobooks, user search queries can be analyzed as appearing in streaming platform searches as well as in various recommendation-based forums. For example, users might start a forum discussion thread asking other users for "books with a strong female protagonist," revealing that the characters of a book might serve as good descriptors to be used for contextualizing recommendations.

This approach has led to the following taxonomy of 10 descriptor types: (1) Genres, e.g. "Juvenile Fiction," (2) Themes or topics, e.g. "Global Politics," (3) Character Descriptions, e.g. "Female Protagonist," (4) Moods, e.g. "Adventurous," (5) Settings, e.g. "China's Cultural Revolution," (6) Personal situations, e.g. "Dealing with Loss," (7) Story tropes, e.g. "Enemies to Lovers," (8) Target audiences, e.g. "Children's Literature," (9) Objective-based, e.g. "Learn Japanese," and (10) Named entities, e.g. "Britney Spears." Notably, more or fewer than 10 descriptor types can be used. Also, similar taxonomies can be developed and used for non-audiobook content, such as music, podcasts, video, etc.

Audio metadata used as input to the LLM can include the title, author(s), description, and Book Industry Standards and Communications (BISAC) genres. Here, the BISAC genres represent a standardized classification system used by the publishing industry to categorize books based on their content. BISAC classifications cover a range of subjects and genres, including fiction categories like romance, mystery, science fiction, fantasy, thriller, and literary fiction, as well as nonfiction categories such as biography, history, self-help, cooking, business, and religion. Each genre may be further divided into specific subgenres. It is assumed that the majority of audiobooks will be associated with this metadata.

For each audiobook in the streaming catalog, the LLM can be used to extract the 10 descriptor types (returning empty lists where there are no relevant descriptors for a descriptor type or the only descriptors for the descriptor type are associated with a confidence level that fails to meet a threshold). The LLM is queried with a prompt containing instructions for each type of descriptor and in-context learning examples. Experimentally, this has resulted in high accuracy by grounding the process on the available metadata and instructing the model with the taxonomy. Thus, the risk of false positives is low.

Figure 4A:
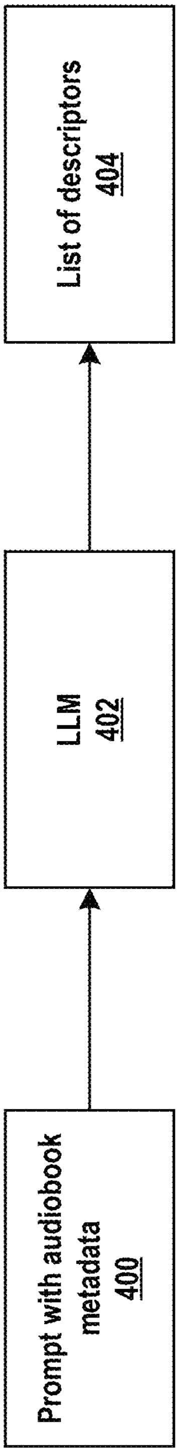
FIG. 4A depicts generating a list of descriptors based on audiobook metadata, in accordance with example embodiments.

FIG. 4A depicts generating a list of descriptors based on audiobook metadata. A prompt 400 including audiobook metadata and instructions for LLM 402 is provided to LLM 402. The instructions may specify that LLM 402 should suggest, based on the metadata of an audiobook, list of descriptors 404 in accordance with a taxonomy of descriptor types (e.g., the taxonomy provided above). A goal is to provide list of descriptors 404 that accurately describe the audiobook.

Figure 4B:
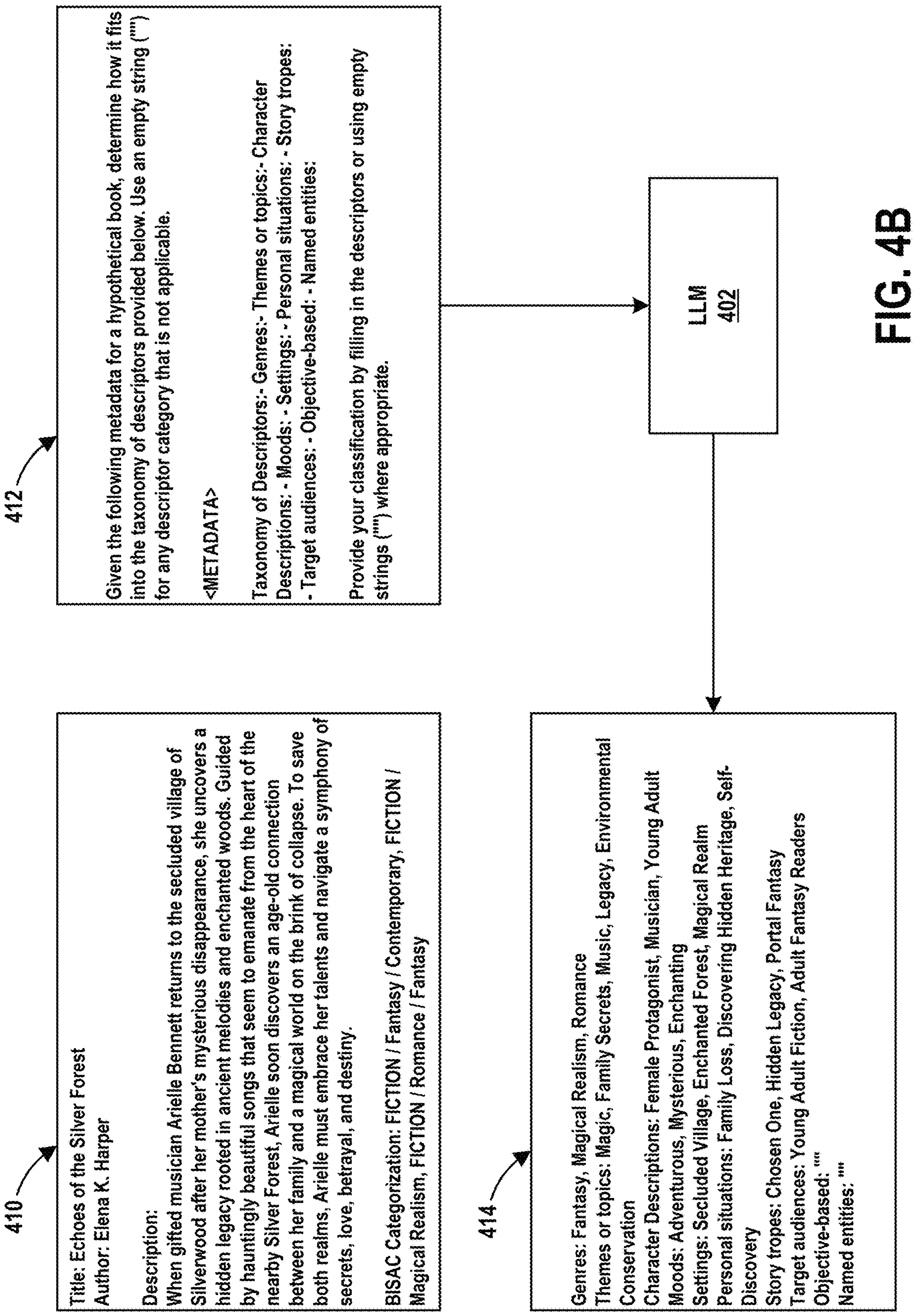
FIG. 4B depicts generating a list of descriptors for a specific audiobook, in accordance with example embodiments.

FIG. 4B depicts generating a list of descriptors for a specific audiobook. This is the process of FIG. 4A but filled out with example audiobook metadata 410, prompt 412, and list of descriptors 414. Particularly, audiobook metadata 410 is incorporated into prompt 412, with the text of audiobook metadata 410 replacing the <METADATA> placeholder in prompt 412. In response to receiving this populated prompt, LLM 402 produces list of descriptors 414. As can be understood from comparing list of descriptors 414 to audiobook metadata 410, list of descriptors 414 is a reasonably accurate representation of the content of the audiobook.

As audiobooks are introduced to the streaming platform as media content items ready for streaming, the procedures of FIGS. 4A and/or 4B may be applied to each. Thus, generation of descriptors based on audiobook metadata and descriptor types may occur in bulk (e.g., for two or more audiobooks) or on a case-by-case basis (e.g., for individual audiobooks). The result may be a catalog of audiobooks categorized by their descriptors in accordance with the taxonomy of descriptor types. For example, these procedures may be executed once per hour for all audiobooks added to the catalog within the last hour.

B. Initial Recommendation of Media Content Items

Figure 5:
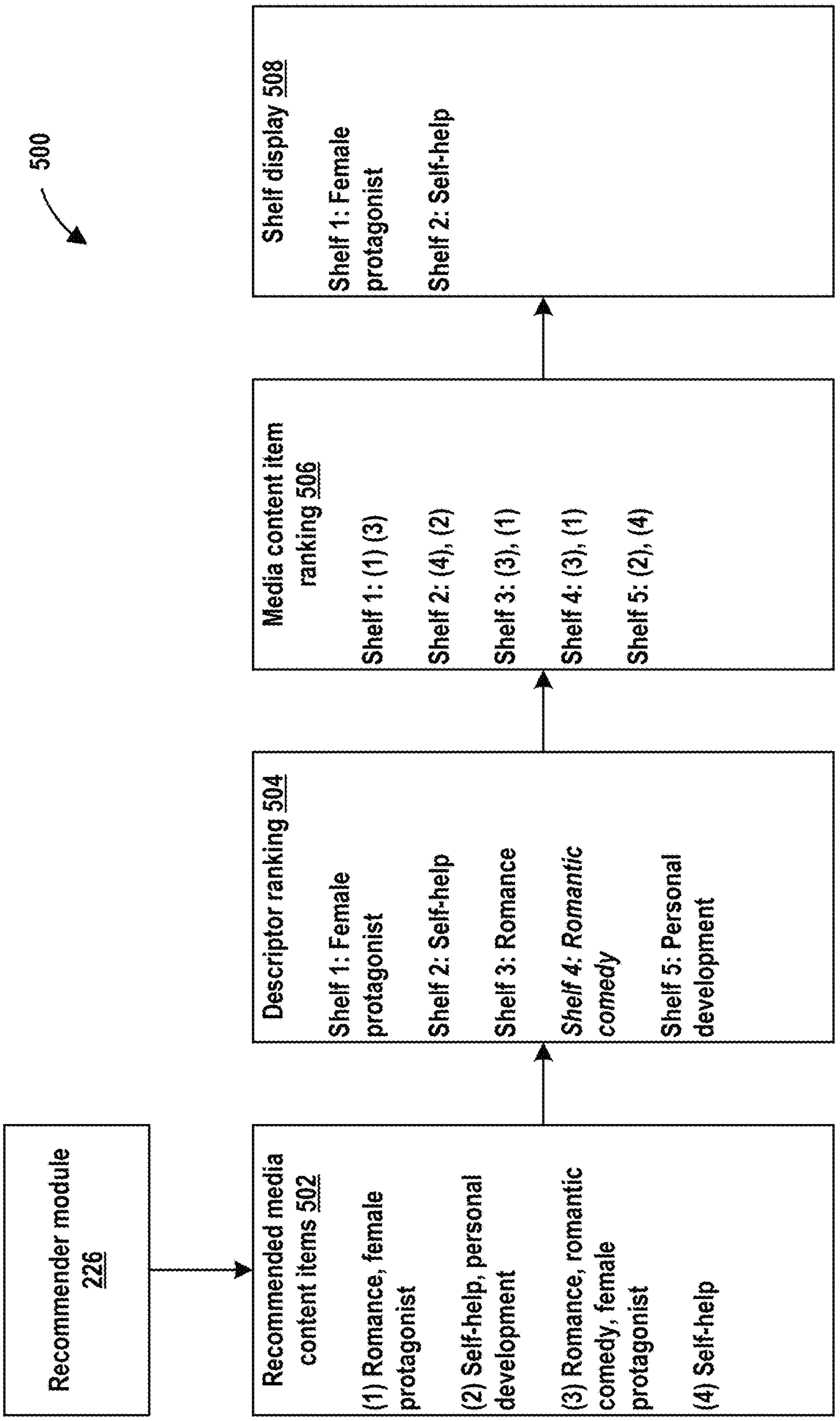
FIG. 5 depicts a procedure for generating a contextual arrangement of media content items, in accordance with example embodiments.

As noted above, there are technical advantages to arranging recommended media content items (e.g., audiobooks) on virtual shelves in accordance with their descriptors. FIG. 5 depicts a procedure 500 for generating a contextual arrangement of media content items in this fashion.

It is assumed that an existing media content item recommendation system (e.g., recommender module 226) is used to generate a candidate set of recommended media content items for a user. These recommended media content items may be generated in response to a user opening an application on their device (e.g., one of electronic devices 102-1 . . . 102-*m*), selecting an option on their device (e.g., an "audiobooks" tab of a streaming application), textually or verbally requesting media content item recommendations, and so on.

Any recommendation system may be used. For example, the existing recommendation system may consider the user's previous media consumption history and could be based on collaborative filtering, content-based filtering, user demographics, and/or media content item popularity. The recommendation system may be configured to generate a larger set of recommended media content items than it otherwise would so that this set can be pared down in the following steps.

Regardless, the resulting recommended media content items 502 are shown in FIG. 5. Recommended media content items 502 include four audiobooks labeled (1), (2), (3), and (4), respectively. One or two descriptors for each of these audiobooks is shown. For instance, audiobook (1) has romance and female protagonist descriptors, audiobook (2) has self-help and personal development descriptors, etc. Each audiobook may be associated with a larger number of descriptors, as exemplified in list of descriptors 414. Only one to three descriptors per audiobook are shown in FIG. 5 for purposes of simplicity. Further, recommended media content items 502 may include dozens or hundreds of audiobooks rather than just four.

C. User-Based Descriptor Ranking

Given recommended media content items 502, a set of their descriptors (or combinations of these descriptors) may be selected. In particular, these descriptors may be selected in a user-specific fashion so that they are relevant to the user for whom the recommendations are being made. The descriptors may also be selected to exhibit diversity.

In some examples, the descriptors of media content items 502 are ranked for the user based on their relevance, e.g., using an affinity model that considers the user's historical interactions with media content items. This ranking may be modified to enhance the diversity of ranked descriptors.

For instance, raw event data from user interactions with media content items, such as views, clicks, likes, shares, comments, completion rates, and/or time spent viewing specific media content items may have been collected as a matter of course. This data may be aggregated into structured user-item interaction matrices or embeddings. The affinity model could then employ methods like collaborative filtering, where similarity scores between users (i.e., a user-user approach) or between media content items (item-item approach) are calculated using, e.g., cosine similarity. Alternatively, content-based filtering can be applied, using metadata attributes or embeddings of media content items, encoded via techniques like TF-IDF, word embeddings (e.g., Word2Vec, BERT), or deep learning-based representations. Affinity scores can be generated by combining these similarity metrics, often through matrix factorization algorithms or embedding approaches from neural networks trained on historical interaction data. Finally, candidate descriptors may be ranked by descending affinity scores, resulting in a personalized descriptor ranking.

Other possibilities exist. As a further example, the descriptors can be ranked based on where they are found in recommended media content items 502 (with those appearing higher in recommended media content items 502 being given more weight than those appearing lower) and/or how often they are found in recommended media content items 502 (with those appearing more frequently in recommended media content items 502 begin given more weight than those appearing less frequently).

Another potential way to rank the descriptors for users is to use a natural language model (e.g., an LLM). This could involve providing the LLM with potential candidate descriptors and user profiles (a natural language description and/or summarization of the users' consumption history) and ask the LLM to rank the descriptors according to pre-defined criteria such as relevance to the user profile, diversity, etc.

Diversity in these rankings refers to a measure of variety among ranked descriptors. It may be advantageous to produce a ranking that spans different descriptor types (and so that the ranking does not include too many descriptors of the same type and/or the same audiobooks appearing in multiple virtual shelves) to limit recommendations of overly similar and/or the same content. Thus, one or more of any group of descriptors that exhibit high similarity in a content embedding space (e.g., a cosine similarity below a threshold value) may be filtered out to improve diversity. Alternatively, one or more techniques may be used that places highly relevant descriptors near the top of the ranking and more diverse descriptors lower in the ranking.

In some embodiments, the descriptors are ranked first and then filtered for diversity. In other embodiments, the descriptors are filtered for diversity first and then ranked. Techniques that combine ranking and diversification may also be employed.

Regardless, the selected descriptors may be used as the basis for the virtual shelves that organize presentation and/or display of recommended media content items. As shown in FIG. 5, descriptor ranking 504 includes five possible virtual shelves, for the female protagonist, self-help, romance, romantic comedy, and personal development descriptors, respectively. Notably, the romantic comedy virtual shelf is shown in italics to indicate that it is a candidate for diversity-based filtering out of descriptor ranking 504 due to its descriptor's similarity with that of the romance virtual shelf.

The number of virtual shelves can be one or more, depending on descriptor ranking 504, user preference, and/ or other settings. For example, a default setting may be to generate three virtual shelves unless a user specifically requests more.

In some embodiments, past user engagement with a virtual shelf and/or audiobooks associated with the virtual shelf may be taken into account when determining whether to display that virtual shelf and/or the audiobook content again in the future. For example, if a user is presented with a virtual shelf labeled as "self-help" and containing audiobooks related to that topic, but the user never engages with (e.g., listens to) any of these audiobooks, this virtual shelf might be down-ranked or omitted in future virtual shelf rankings. Other embodiments may add a degree of randomness to the descriptor selection and/or ranking process, or take trending content or descriptors into account when generating and populating shelves.

D. Population of Virtual Shelves

The virtual shelves of descriptor ranking 504 may be populated with media content items with matching or similar descriptors (here, similarity may be based on word embeddings or transformer-based models, for example). In some cases, media content items lacking a descriptor that matches or is similar to any of the virtual shelves are filtered out. The remaining media content items may be ranked per virtual shelf based on their previous rankings by the existing media content item recommendation system. Media content items that match more than one shelf could appear in just one of these shelves or in all matching shelves.

In FIG. 5, media content item ranking 506 shows recommended media content items 502 arranged in accordance with the virtual shelves derived from descriptor ranking 504. For instance, in media content item ranking 506 virtual shelf 1 ("female protagonist") includes media content items (1) and (3) (both audiobooks with female protagonist descriptors). Likewise, virtual shelf 2 ("self-help") includes media content items (4) and (2) (both audiobooks with self-help descriptors. In virtual shelf 2, media content item (4) may be ranked ahead of media content item (2) due to media content item (4) being more focused on self-help (e.g., media content item (4) only has a descriptor for self-help while media content item (2) has that and other descriptors.

In some cases, a combination of descriptors may be used for virtual shelves that otherwise are too broad, e.g., a virtual shelf may contain audiobooks based on a combination of the genre and mood descriptor types rather than either genre or mood alone. As an example, the broad descriptor of virtual shelf 1 ("female protagonist") may result in dozens or hundreds of recommended audiobooks appearing in this virtual shelf. However, if this descriptor is combined with another from descriptor ranking 504, such as "romance", the resulting shelf may have a manageable number of audiobooks. In some cases, an over-populated virtual shelf (e.g., "female protagonist") can be divided into two or more smaller virtual shelves (e.g., "female protagonist, romance" and "female protagonist, adventure"). As a result, users may find the recommendations more useful and less overwhelming. Thus, if there are more than a threshold number of recommended audiobooks (e.g., 20, 30, 40, 50, etc.) that are initially placed on a virtual shelf they may be filtered or divided into one or more narrower-scoped virtual shelves as described above.

E. Display of Virtual Shelves

As shown in FIG. 5, shelf display 508 may include one or more virtual shelves containing audiobooks selected in the aforementioned fashion. These virtual shelves can be implemented using scrollable user interface components, typically leveraging frameworks like React, SwiftUI, or web-based frameworks. Each virtual shelf could be structured as a horizontally scrollable container populated dynamically from backend APIs that return formatted metadata such as audiobook covers, titles, authors, and ratings. Vertical scrolling can be used to display different virtual shelves.

On mobile and tablet devices, touch input can enable scrolling via swipe gestures, managed through native gesture handlers or touch-event listeners. On desktop or laptop computers, scrolling can be achieved through mouse-wheel events, horizontal scrollbars, or clickable navigation arrows positioned on each end of the shelf Progressive loading or lazy-loading techniques can be employed to loading audiobook thumbnails and metadata asynchronously as users scroll. To provide visual feedback and indicate the presence of additional off-screen items, partial visibility or subtle gradient overlays can be applied at the edges of virtual shelves.

Notably, the above is just one set of techniques that can be used to implement scrollable virtual shelves. Other techniques may be possible.

V. EXAMPLE TECHNICAL IMPROVEMENTS

These embodiments provide a technical solution to a technical problem. One technical problem being solved is making efficient and accurate recommendations of media content items (e.g., audiobooks) to users. In practice, this is problematic because inefficient and/or inaccurate recommendation systems are unable to address the cold-start problem and lead to excessive computation resource consumption (e.g., processing, memory, network, and/or power capacity).

Current recommendation systems can rely on user reviews and/or user-generated tags when making recommendations of new media content items to a user. However, when new content is added to a media content item catalog, there is a cold-start problem in that this user-generated content is not yet available. By relying on enhanced metadata, some of which may be descriptors generated by a natural language model (e.g., an LLM), the cold-start problem is addressed.

Further, while invoking an LLM can be computationally expensive to some extent, that expense is mitigated in the embodiments described herein. Particularly, the LLM is only invoked once per media content item to generate descriptors. Then, these descriptors can be reused as many times as needed for as many users as needed without further LLM involvement.

Moreover, improving a media content item recommendation system can directly lead to technical enhancements in computing systems by reducing resource consumption such as processing, memory, network, and/or power capacity. A more accurate recommendation algorithm reduces unnecessary processing by precisely identifying relevant media content items to recommend, eliminating extensive computations associated with analyzing large datasets of user behavior or content metadata. Consequently, less processor time and fewer memory resources are spent on redundant analyses. Moreover, when users receive accurate recommendations, they spend less time browsing, sampling, or initiating unnecessary playout of media content items, significantly decreasing network traffic and bandwidth consumption. Fewer requests and shorter streaming sessions directly translate into reduced power usage across servers, data centers, and user devices. Thus, enhanced recommendation accuracy leads to a more efficient, sustainable, and resource-friendly computing infrastructure.

Other technical improvements may also flow from these embodiments, and other technical problems may be solved. Thus, this statement of technical improvements is not limiting and instead constitutes examples of advantages that can be realized from the embodiments.

VI. EXAMPLE OPERATIONS

Figure 6:
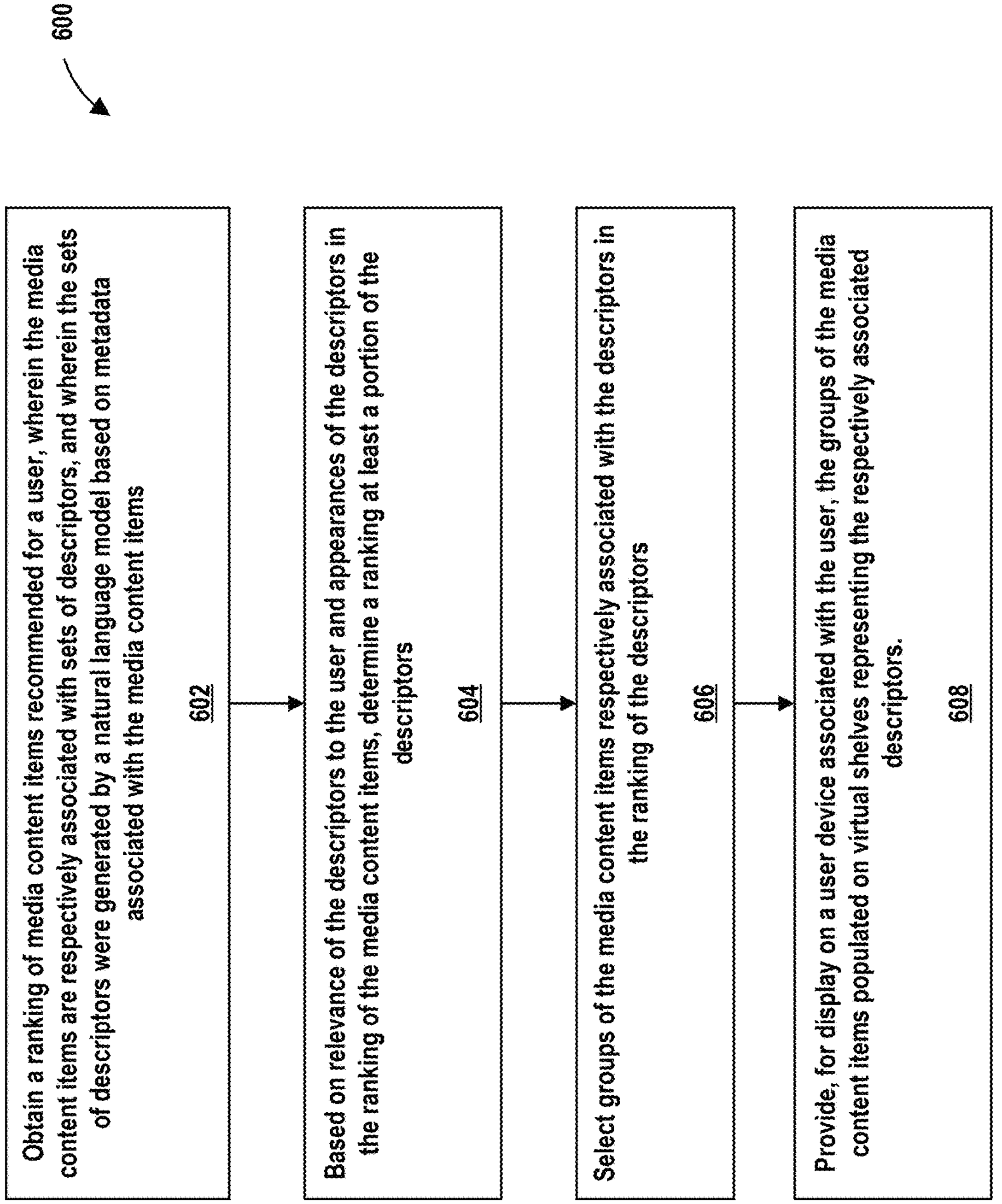
FIG. 6 is a flow chart, in accordance with example embodiments.

FIG. 6 is a flow chart 600 illustrating an example embodiment. The process illustrated by FIG. 6 may be carried out by a computing device, such as media content server 104, and/or one or more additional computing devices arranged to prepare digital audio content. Alternatively, the process can be carried out by other types of devices or device subsystems.

The embodiments of FIG. 6 may be simplified by the removal of any one or more of the features shown therein. Further, these embodiments may be combined with features, aspects, and/or implementations of any of the previous figures or otherwise described herein.

Block 602 may involve obtaining a ranking of media content items recommended for a user, wherein the media content items are respectively associated with sets of descriptors, and wherein the sets of descriptors were generated by a natural language model based on metadata associated with the media content items.

Block 604 may involve, based on relevance of the descriptors to the user and appearances of the descriptors in the ranking of the media content items, determining a ranking at least a portion of the descriptors.

Block 606 may involve selecting groups of the media content items respectively associated with the descriptors in the ranking of the descriptors.

Block 608 may involve providing, for display on a user device associated with the user, the groups of the media content items populated on virtual shelves representing the respectively associated descriptors.

In some embodiments, the media content items comprise audiobooks.

In some embodiments, the sets of descriptors being generated by the natural language model comprises: determining audiobook information including at least one of author, title, and/or description for each of the audiobooks; providing, to the natural language model, a query instructing the natural language model to determine the sets of descriptors based on the audiobook information and a taxonomy of descriptor types; and receiving, from the natural language model, the sets of descriptors.

In some embodiments, the relevance of the descriptors to the user is based on historical interactions between the user and a plurality of media content items.

In some embodiments, determining the ranking of the descriptors based on the appearances of the descriptors in the ranking of the media content items comprises determining the ranking of the descriptors based on a count of the appearances of the descriptors in the ranking of the media content items, and/or based on locations of the associated descriptors in the ranking of media content items.

In some embodiments, determining the ranking of the descriptors is also based on diversity between the descriptors.

In some embodiments, selecting the groups of the media content items comprises prioritizing selection of selecting media content items with associated descriptors appearing higher and/or more frequently in the ranking of descriptors.

Some embodiments may further involve, prior to providing the groups of the media content items populated on the virtual shelves: combining two or more of the descriptors from the ranking of the descriptors, and selecting a group of the media content items respectively associated with each of the two or more of the descriptors.

Figure 7:
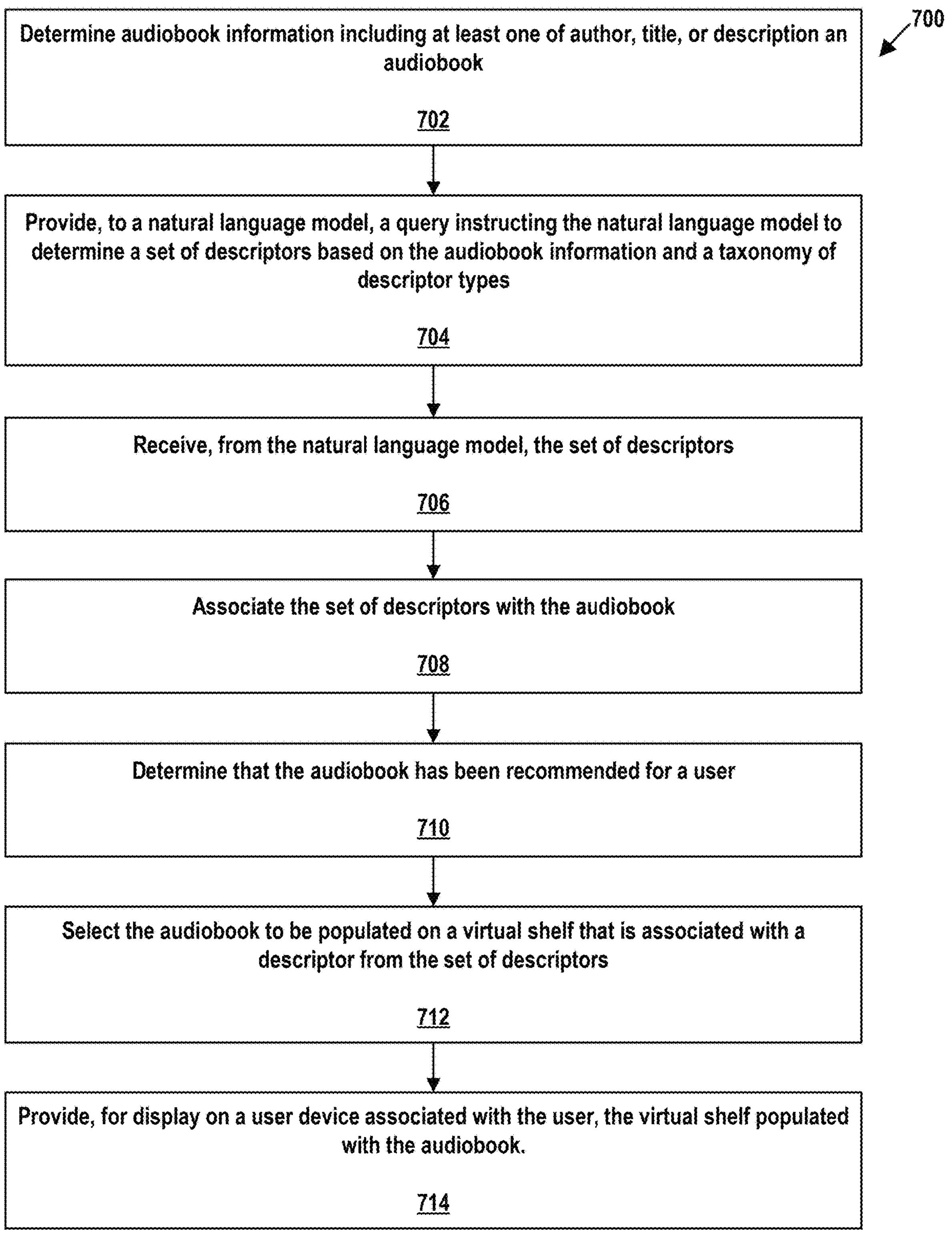
FIG. 7 is a flow chart, in accordance with example embodiments.

FIG. 7 is a flow chart 700 illustrating an example embodiment. The process illustrated by FIG. 7 may be carried out by a computing device, such as media content server 104, and/or one or more additional computing devices arranged to prepare digital audio content. Alternatively, the process can be carried out by other types of devices or device subsystems.

The embodiments of FIG. 7 may be simplified by the removal of any one or more of the features shown therein. Further, these embodiments may be combined with features, aspects, and/or implementations of any of the previous figures or otherwise described herein.

Block 702 may involve determining audiobook information including at least one of author, title, and/or description of an audiobook.

Block 704 may involve providing, to a natural language model, a query instructing the natural language model to determine a set of descriptors based on the audiobook information and a taxonomy of descriptor types.

Block 706 may involve receiving, from the natural language model, the set of descriptors.

Block 708 may involve associating the set of descriptors with the audiobook.

Block 710 may involve determining that the audiobook has been recommended for a user.

Block 712 may involve selecting the audiobook to be populated on a virtual shelf that is associated with a descriptor from the set of descriptors.

Block 714 providing, for display on a user device associated with the user, the virtual shelf populated with the audiobook.

In some embodiments, selecting the audiobook to be populated on the virtual shelf comprises: determining that a ranking of the descriptor meets a selection criterion; and selecting the audiobook based on the ranking of the descriptor meeting the selection criterion.

In some embodiments, the ranking of the descriptor is based on relevance of the descriptor to the user.

In some embodiments, the relevance of the descriptor to the user is based on historical interactions between the user and a plurality of media content items.

VII. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of non-transitory computer readable medium such as a storage device including RAM, ROM, a disk drive, a solid-state drive, or another tangible storage medium.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:

obtaining a ranking of media content items recommended for a user, wherein the media content items are respectively associated with sets of descriptors, and wherein the sets of descriptors were generated by a natural language model based on metadata associated with the media content items;

based on relevance of the descriptors to the user and appearances of the descriptors in the ranking of the media content items, determining a ranking of at least a portion of the descriptors;

selecting groups of the media content items respectively associated with the descriptors in the ranking of the descriptors; and providing, for display on a user device associated with the user, the groups of the media content items populated on virtual shelves representing the respectively associated descriptors.

2. The computer-implemented method of claim 1, wherein the media content items comprise audiobooks.

3. The computer-implemented method of claim 2, wherein the sets of descriptors being generated by the natural language model comprises:

determining audiobook information including at least one of author, title, or description for each of the audiobooks;

providing, to the natural language model, a query instructing the natural language model to determine the sets of descriptors based on the audiobook information and a taxonomy of descriptor types; and receiving, from the natural language model, the sets of descriptors.

4. The computer-implemented method of claim 1, wherein the relevance of the descriptors to the user is based on historical interactions between the user and a plurality of media content items.

5. The computer-implemented method of claim 1, wherein determining the ranking of the descriptors based on the appearances of the descriptors in the ranking of the media content items comprises:

determining the ranking of the descriptors based on a count of the appearances of the descriptors in the ranking of the media content items, or based on locations of the associated descriptors in the ranking of media content items.

6. The computer-implemented method of claim 1, wherein determining the ranking of the descriptors is also based on diversity between the descriptors.

7. The computer-implemented method of claim 1, wherein selecting the groups of the media content items comprises prioritizing selection of selecting media content items with associated descriptors appearing higher or more frequently in the ranking of descriptors.

8. The computer-implemented method of claim 1, further comprising:

prior to providing the groups of the media content items populated on the virtual shelves: combining two or more of the descriptors from the ranking of the descriptors, and selecting a group of the media content items respectively associated with each of the two or more of the descriptors.

9. A computer-implemented method comprising:

determining audiobook information including at least one of author, title, or description of an audiobook;

providing, to a natural language model, a query instructing the natural language model to determine a set of descriptors based on the audiobook information and a taxonomy of descriptor types;

receiving, from the natural language model, the set of descriptors;

associating the set of descriptors with the audiobook;

determining that the audiobook has been recommended for a user;

selecting the audiobook to be populated on a virtual shelf that is associated with a descriptor from the set of descriptors; and providing, for display on a user device associated with the user, the virtual shelf populated with the audiobook.

10. The computer-implemented method of claim 9, wherein selecting the audiobook to be populated on the virtual shelf comprises:

determining that a ranking of the descriptor meets a selection criterion; and selecting the audiobook based on the ranking of the descriptor meeting the selection criterion.

11. The computer-implemented method of claim 10, wherein the ranking of the descriptor is based on relevance of the descriptor to the user.

12. The computer-implemented method of claim 11, wherein the relevance of the descriptor to the user is based on historical interactions between the user and a plurality of media content items.

13. A non-transitory computer-readable medium, storing program instructions that, when executed by one or more processors of a computing system, cause the computing system to perform operations comprising:

obtaining a ranking of media content items recommended for a user, wherein the media content items are respectively associated with sets of descriptors, and wherein the sets of descriptors were generated by a natural language model based on metadata associated with the media content items;

based on relevance of the descriptors to the user and appearances of the descriptors in the ranking of the media content items, determining a ranking of at least a portion of the descriptors;

selecting groups of the media content items respectively associated with the descriptors in the ranking of the descriptors; and providing, for display on a user device associated with the user, the groups of the media content items populated on virtual shelves representing the respectively associated descriptors.

14. The non-transitory computer-readable medium of claim 13, wherein the media content items comprise audiobooks.

15. The non-transitory computer-readable medium of claim 14, wherein the sets of descriptors being generated by the natural language model comprises:

determining audiobook information including at least one of author, title, or description for each of the audiobooks;

providing, to the natural language model, a query instructing the natural language model to determine the sets of descriptors based on the audiobook information and a taxonomy of descriptor types; and receiving, from the natural language model, the sets of descriptors.

16. The non-transitory computer-readable medium of claim 13, wherein the relevance of the descriptors to the user is based on historical interactions between the user and a plurality of media content items.

17. The non-transitory computer-readable medium of claim 13, wherein determining the ranking of the descriptors based on the appearances of the descriptors in the ranking of the media content items comprises:

determining the ranking of the descriptors based on a count of the appearances of the descriptors in the ranking of the media content items, or based on locations of the associated descriptors in the ranking of media content items.

18. The non-transitory computer-readable medium of claim 13, wherein determining the ranking of the descriptors is also based on diversity between the descriptors.

19. The non-transitory computer-readable medium of claim 13, wherein selecting the groups of the media content items comprises prioritizing selection of selecting media content items with associated descriptors appearing higher or more frequently in the ranking of descriptors.

20. The non-transitory computer-readable medium of claim 13, the operations further comprising:

prior to providing the groups of the media content items populated on the virtual shelves: combining two or more of the descriptors from the ranking of the descriptors, and selecting a group of the media content items respectively associated with each of the two or more of the descriptors.

* * * * *